United States Patent [19]
Stingel, Jr. et al.

[11] Patent Number: 5,903,464
[45] Date of Patent: May 11, 1999

[54] CONVEYING SYSTEM AND METHOD FOR MIXING STACKED ARTICLES

[76] Inventors: Frederick John Stingel, Jr., 8 Cedar Chine, Biltmore Forest, N.C. 28802; Frederick John Stingel, III; Jeffrey William Stingel, both of 115 Vista Blvd., Arden, N.C. 28704

[21] Appl. No.: 08/813,166

[22] Filed: Mar. 7, 1997

[51] Int. Cl.⁶ .................................................. B65G 60/00
[52] U.S. Cl. ................................ 364/478.03; 198/347.1; 414/788.4; 414/789.6
[58] Field of Search ...................... 198/347.1; 414/788.4, 414/788.8, 789.6, 791.6; 364/478.03, 478.13, 478.14

[56] References Cited

U.S. PATENT DOCUMENTS

| | | |
|---|---|---|
| 3,262,584 | 7/1966 | Hayford, Jr. et al. ................... 414/792 |
| 5,269,646 | 12/1993 | Focke ............................... 414/789.6 X |
| 5,636,966 | 6/1997 | Lyon et al. ........................ 414/789.6 X |

*Primary Examiner*—Janice L. Krizek
*Attorney, Agent, or Firm*—Quarles & Brady LLP

[57] ABSTRACT

Homogeneous layers of articles are mixed in a conveying apparatus, and in accordance with a conveying method. A first conveying path originates at a first working station and terminates at a second working station. A second conveying path originates at the second working station. The first working station selectively moves successive homogeneous layers of articles from respective stacks to the first conveying path. The second working station receives the articles from the first conveying path and distributes the articles into selected ones of a plurality of vertical conveying and storage paths. The articles are supplied to the second conveying path from the vertical conveying and storage paths in a predetermined sequence. The predetermined sequence is established by defining control sequences for the moving, distributing and supplying performed in the work stations. The articles conveyed on the second conveying path can be arranged into groups related to the predetermined sequence.

20 Claims, 5 Drawing Sheets

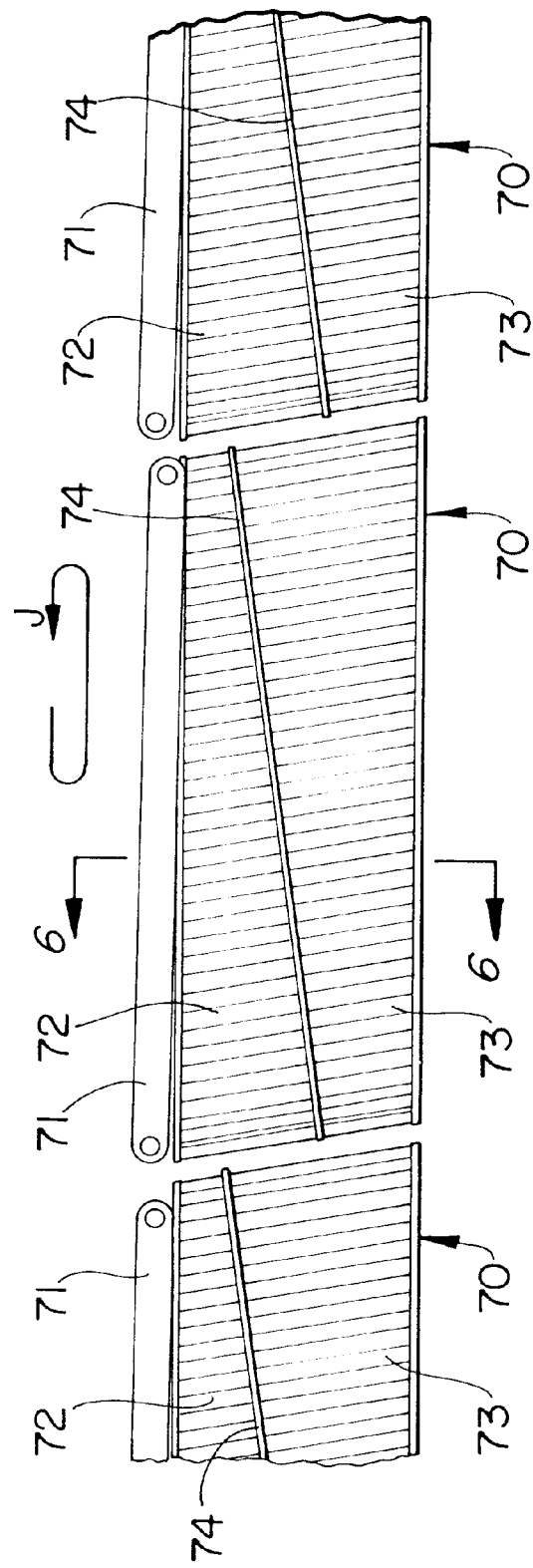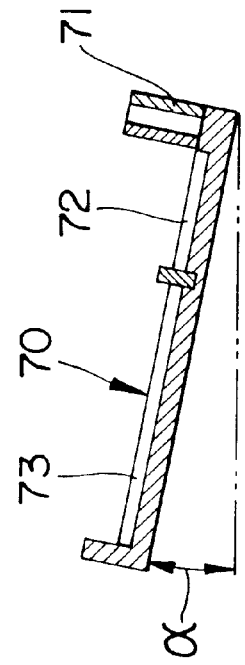
FIG. 5
FIG. 6

CONVEYING SYSTEM AND METHOD FOR MIXING STACKED ARTICLES

BACKGROUND OF THE INVENTION

1. Field of the Invention

This invention relates generally to the field of conveying articles for rearranging, and in particular, to methods and apparatus for mixing articles stacked in homogeneous layers on respective pallets.

2. Description of Related Art

A method and apparatus for rearranging articles palletized according to sorts, to form new groups of specific sort composition, is known from U.S. Pat. No. 5,269,646. As taught and claimed therein, a system for handling articles of different types comprises: a plurality of depallitizing stations; means for removing a layer of articles from a pallet, said removing means associated with each of the plurality of depallitizing stations; a plurality of band conveying means, each of the plurality of conveying means comprising a plurality of conveying bands; a plurality of sort conveying means, each of the plurality of sort conveying means being parallel to one another; a plurality of sort stores, each of the plurality of sort stores being parallel to one another; at least one group-forming station; and, group conveying means for transporting articles from the sort conveying means to the at least one group-forming station; wherein each of the plurality of depallitizing stations has associated therewith one of said band conveying means, each band conveying means has associated therewith a subset of said plurality of sort conveying means, the band conveying means conveying an article removed from the pallet by the removing means to one of the plurality of sort conveying means in the associated subset, and each sort conveying means has associated therewith a sort store for temporarily holding articles. A corresponding method is also taught and claimed. A significant problem with the foregoing system can be appreciated from FIG. 1 or 2 thereof, and the text, namely that a separate path 20, 21, 22, etc., is required for each row of articles in the stacked layers, and that each separate path requires a separate vertical stacking rack. The vertical stacking rack must operate bidirectionally. The system is further characterized by a continuous conveying path, which at times, has parallel branches. The cost of having multiple palletizing stations and multiple stacking racks may be reasonable for the small lightweight articles contemplated, which in the example have a length of only 255 mm, but the cost for multiple stations capable of large and heavier articles is prohibitive. While the use of a single conveying path may seem to simplify the system, it actually places greater restraints on the relative operating speeds of the different work stations, complicating overall control. Moreover, the multiple parallel conveying paths are difficult to coordinate in timing and, together with the multiple palletizing stations and multiple stacking racks, use a lot of floor space.

SUMMARY OF THE INVENTION

The problems associated with apparatus and methods for mixing articles in accordance with the prior art can be overcome in accordance with the inventive arrangements taught herein. In accordance with these inventive arrangements, only one depallitizing station, for example using an overhead gantry crane, is required, simplifying control and using less floor space. Heavy and large articles, including fragile articles like beverage containers, can be safely and efficiently sorted and mixed. At least two separate conveying paths enable more efficient and independent operation of respective working stations, particularly with respect to articles distributed to vertical conveying and storage paths, and articles supplied from the vertical conveying and storage paths. The vertical conveying and storage paths can be operated unidirectionally, for further control simplification. Moreover, the vertical conveying and storage paths can be disposed in the same rack, saving even more floor space.

A system for mixing different articles from respective homogeneous stacks of homogeneous layers, in accordance with an inventive arrangement, comprises: first and second working stations; a first conveying path originating at the first working station and terminating at the second working station; a second conveying path originating at the second working station; the first working station having means for selectively moving successive homogeneous layers of articles from each of the respective stacks to the first conveying path; the second working station receiving the articles from the first conveying path and distributing the articles into selected ones of a plurality of vertical conveying and storage paths, the articles being supplied to the second conveying path from the vertical conveying and storage paths in a predetermined sequence; and, means for controlling the first and second working stations to establish the predetermined sequence.

The system can further comprise a third working station forming a part of the first conveying path, the third working station having means for rearranging each of the successive layers of articles into aligned rows of articles, the aligned rows of articles being conveyed to the second working station.

The system can also further comprise a fourth working station, at which the second conveying path terminates, the fourth working station having means for regrouping the articles in an arrangement depending upon the predetermined sequence.

The control means establishes a first control sequence for the moving of the successive homogeneous layers, establishes a second control sequence for the distributing of the articles into the plurality of vertical conveying and storage paths and establishes a third control sequence for the supplying of the articles to the second conveying path. The control means can track SKU identifiers of the articles and can predetermine the sequence according to one of a plurality of delivery criteria.

In a presently preferred embodiment, the distributing means comprises a sorting rack for receiving the removed articles, the rack having a plurality of respective sets of shelves movably supported on the rack in a staggered orientation enabling the articles to be conveyed along the plurality of different and selectable vertical paths. The vertical conveying is preferably unidirectional, in a downwardly direction.

A method for mixing different articles from respective homogeneous stacks of homogeneous layers, in accordance with another inventive arrangement, comprises the steps of: selectively moving successive homogeneous layers of articles from each of the respective stacks to a first conveying path in an ordered sequence; distributing the articles conveyed on the first conveying path into different ones of a plurality of selectable vertical conveying and storage paths; terminating the first conveying path at the vertical conveying and storage paths; supplying the articles from the different vertical conveying and storage paths to a second conveying path in a predetermined sequence; and, arranging the articles conveyed on the second conveying path into groups related to the predetermined sequence.

The method can further comprise the steps of: rearranging each of the successive layers of articles into successive aligned rows of articles along the first conveying path; and, distributing the aligned rows of the articles into the different ones of the plurality of the selectable vertical conveying and storage paths.

The articles are preferably conveyed unidirectionally in the vertical conveying paths, and further, preferably downwardly.

The method can also comprise the further step of establishing the predetermined sequence of the articles on the second conveying path by defining control sequences for each of the moving, distributing and supplying steps.

BRIEF DESCRIPTION OF THE DRAWINGS

FIG. 5 is a top plan view, in diagrammatic form, illustrating the aligning means of the conveying system shown in FIG. 1.

FIG. 6 is a section view taken along the line 6—6 in FIG. 5.

DETAILED DESCRIPTION OF THE PREFERRED EMBODIMENTS

Figure 1:
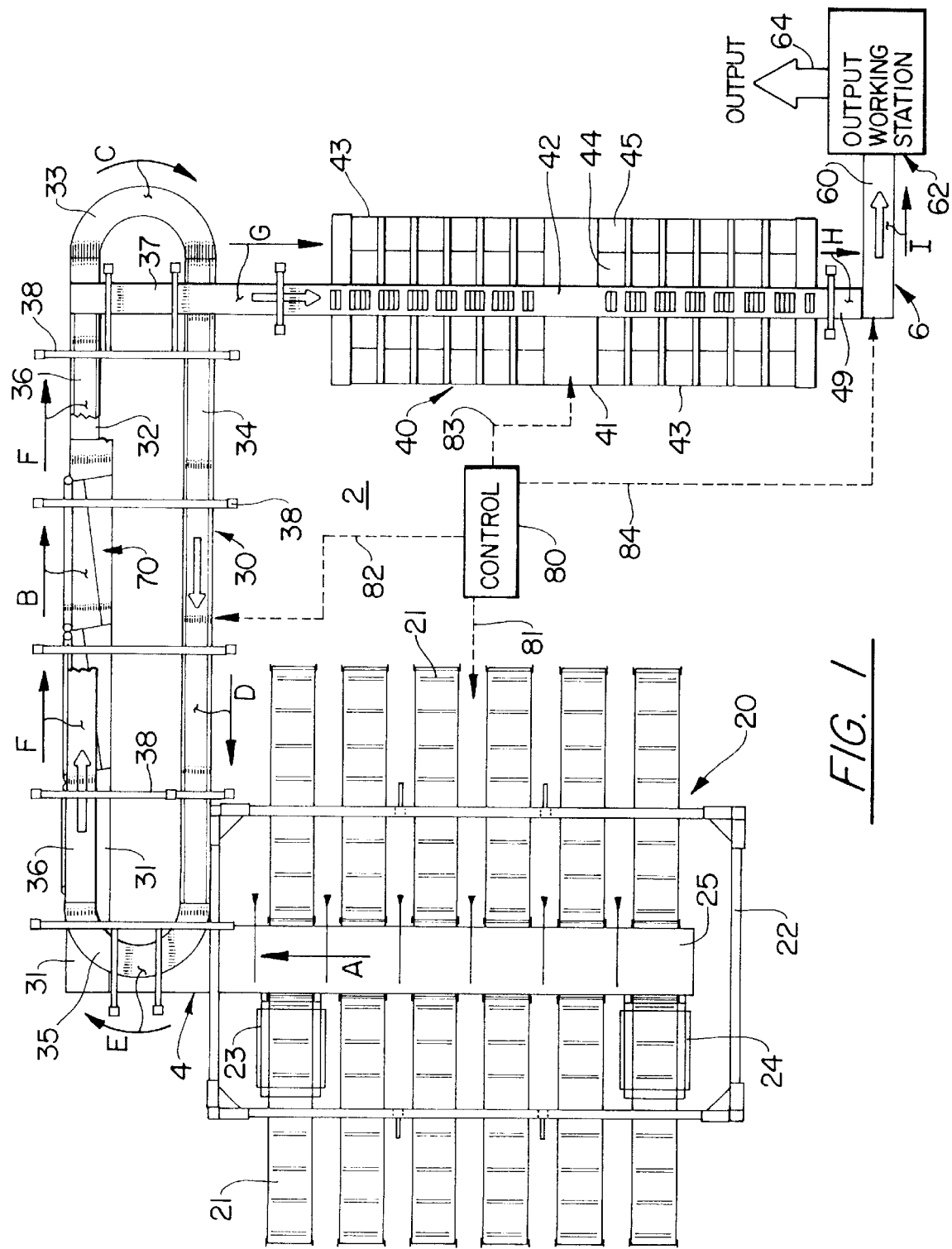
FIG. 1 is a plan view, in diagrammatic form, of a conveying system in accordance with an inventive arrangement.

A conveying system for mixing stacked articles in accordance with an inventive arrangement is shown in top plan view in FIG. 1 and generally designated by reference numeral 2. The conveying system 2 comprises a first working station 20 and a second working station 40. A first conveying path 4 originates at the first working station 20 and terminates at the second working station 40. A second conveying path 6 originates at the second working station 40. The system can further comprise a third working station 70 forming a part of the first conveying path 4 and can also further comprise a fourth working station 62 at which the second conveying path 6 terminates. The configuration and placement of the working stations and conveying paths will be determined by the amount and shape of floor space available for installing the conveying system. None of the inventive arrangements is limited by the particular relative placement and orientation of the working stations and conveying paths shown in the drawings. The relative orientation and configuration of the working stations and conveying paths shown in FIGS. 1 and 2 corresponds to one presently operating system.

Working station 20 can best be described as a depallitizing working station. Working station 20 comprises a plurality of pallet in-feed conveyors 21, which carry loaded pallets having articles to be processed by the system. Loaded pallets 23 and 24 are indicated.

Figure 2:
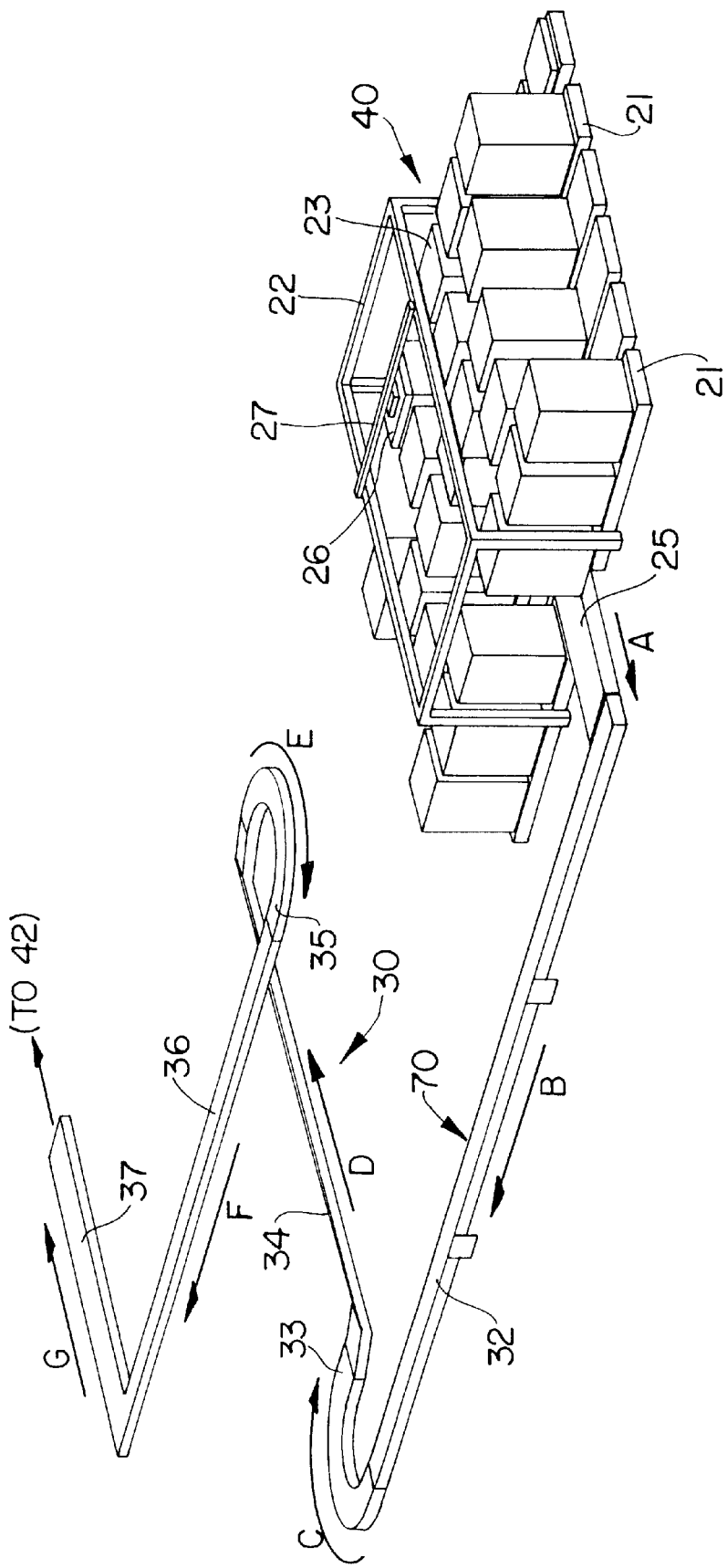
FIG. 2 is perspective view of a portion of FIG. 1, illustrating the multi level configuration of the conveying system.

Working station 20 includes a frame and girder structure 22 supporting a gantry crane 26, shown in FIG. 2, which is itself supported on a movable cross bar assembly 27.

Each of the pallets, for example, pallets 23 and 24, carries respective homogeneous stacks of homogeneous layers of articles to be mixed, for example, cartons of beverage containers. The gantry crane 26 is adapted to selectively move successive homogeneous layers of the articles from each of the respective stacks to conveyor 25, forming a first part of the first conveying path 4. Other means are known in the art for unloading articles from pallets, and may be employed instead of a gantry crane. Use of such a gantry crane 26 is presently preferred. Conveyor 25 transports articles removed from the pallets in the direction of arrow A.

The first conveying path 4 is a bi-level conveying path as shown in the drawings. Accordingly, reference should be made to both FIGS. 1 and 2 during the following description of the first conveying path. Articles are transferred from conveyor 25 to conveyor 31, disposed at right angles thereto. Conveyor 31 is a part of the first conveying path which can include the third working station 70. Working station 70 can be provided for rearranging each of the successive layers of articles, which are conveyed in a group into aligned rows of the articles, such that the aligned rows of articles are conveyed to the second working station 40. The operation of working station 70 will be explained in more detail in connection with FIGS. 5 and 6. The aligned articles are transported by conveyor 36, which due to the alignment of the articles, can be narrower than conveyor 31. The conveying direction for conveyor 31, working station 70 and conveyor 36 is shown by arrow B.

The aligned articles are then transported by semi-circular conveyor 33, in the direction shown by arrow C. The articles are then transported upwardly on a ramp formed by conveyor 34, in the direction indicated by arrow D. The articles are then transported by a second semi-circular conveyor 35, in the direction indicated by arrow E. The articles are then transported by conveyor 36, in the direction indicated by arrow F. Conveyor 36 is partially cut away in FIG. 1 in order to show working station 70. Finally, the articles are transported by conveyor 37, at right angles to conveyor 36, and in the direction shown by arrow G, into the second working station 40. Working station 40 includes an upper conveyor 42, which is the final part of the first conveying path 4.

As shown, the first conveying path 4 comprises conveyors 25, 31, 32, 33, 34, 35, 36, 37 and 42, as well as working station 70, disposed between conveyors 31 and 32. The various conveyors which constitute the first conveying path are mounted on a support structure indicated by structural members 38.

The double-back configuration of the first conveying path is particularly efficient for enabling the first and second working stations to be located relatively close to one another.

Figure 3:
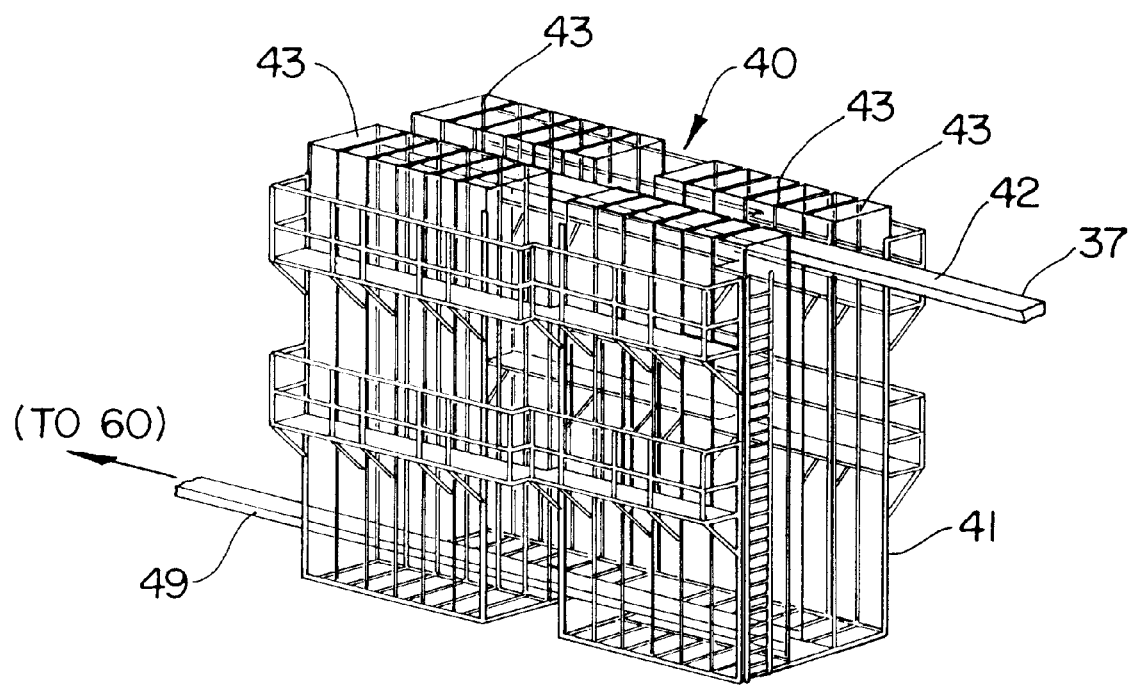
FIG. 3 is a perspective view of a rack and shelf system defining vertical conveying and storage paths in accordance with the inventive arrangement.

The various motors driving the conveyors of the first conveying path 4 have been omitted for purposes of clarity, but for purposes of illustration, and except as noted, one horsepower motors have been found sufficient throughout. The conveying speed for most of the first conveying path is approximately 90 feet per minute. The conveying speed up the ramp formed by conveyor 34 is about 60 feet per minute. In the illustrated embodiment, the ramp conveyor 34 rises approximately 18 feet. A two horsepower motor is presently preferred for the conveyor 42 forming part of the second working station 40, and forming the last part of the first conveying path. It is helpful in the understanding of FIG. 1 to appreciate that the input conveyor 42 of working station 40 is approximately 18 feet higher than the output conveyor 49 associated with working station 40, as shown in FIG. 3.

The conveyor 49 and conveyor 60, which transport articles from working station 40 to the fourth, output working station 62, form the second conveying path 6. The first and second conveying paths 4 and 6 are not connected directly to one another. With reference to both FIGS. 1 and 3, the second working station 40 receives the articles from the first conveying path 4 and distributes the articles into selected ones of a plurality of vertical conveying and storage paths 43. The second working station 40 comprises a sorting rack for receiving the removed articles. The rack has a plurality of respective sets of shelves movably supported on the rack in a staggered orientation, enabling the articles to be conveyed along the plurality of different and selectable vertical paths. The vertical conveying is preferably unidirectional, in a downwardly direction. Articles are transported from the first conveying path 4 to the second conveying path 6 along the different ones of the vertical conveying and storage paths. In the presently preferred embodiment, the second working station comprises a rack 41 having twenty-four vertical and storage conveying paths 43. Any article can be transported into any one of the vertical conveying and storage paths, providing that the particular vertical conveying and storage path is not full.

Figure 4:
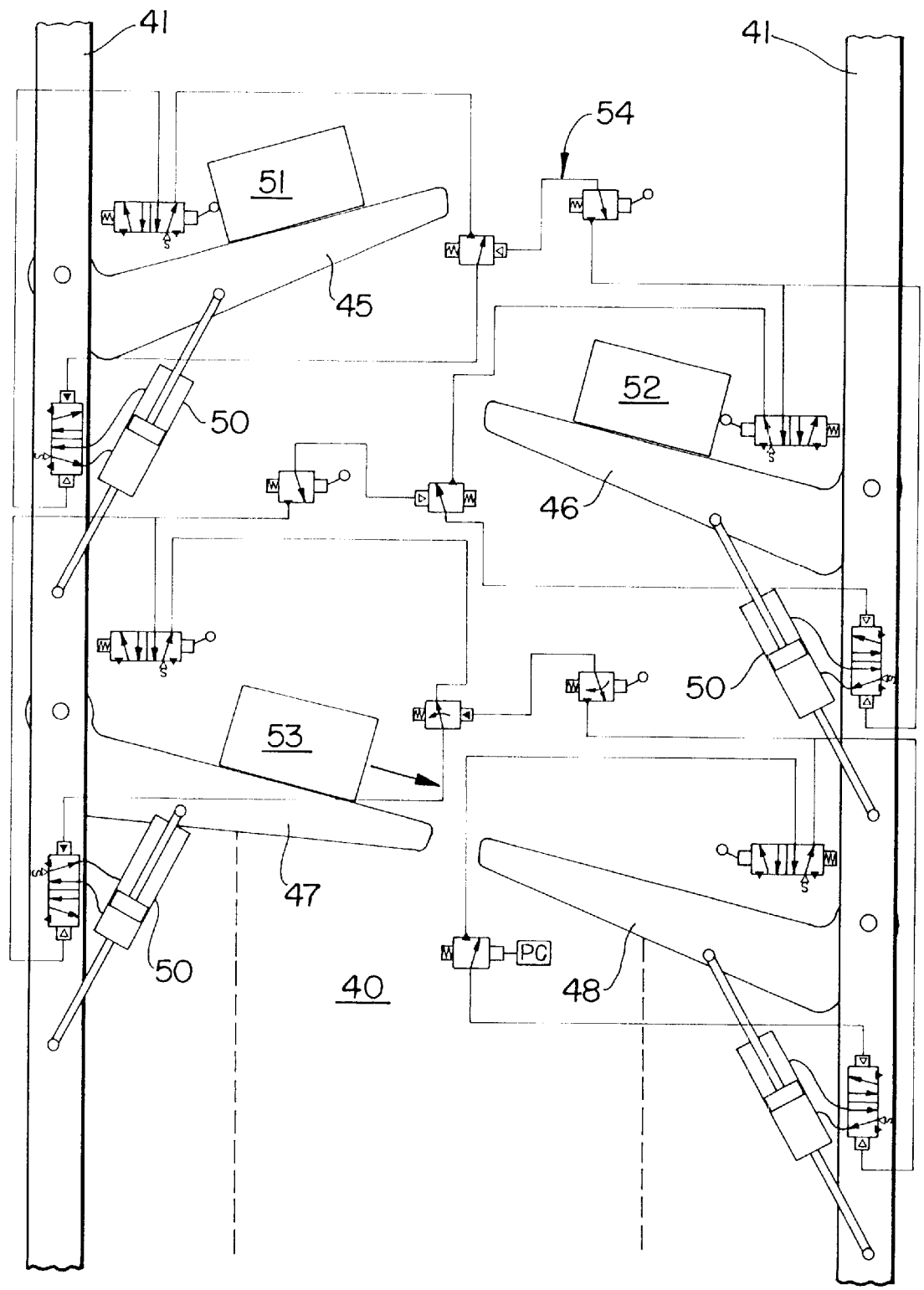
FIG. 4 is a partial side view illustrating operation of the shelves in the rack and shelf system of FIG. 3.

As shown particularly in FIG. 4, the vertical conveying and storage paths 43 generally include two opposing, substantially vertical stacks of staggered shelves mounted on a support structure. The stacks can consist of any number of shelves, but shelves 45, 46, 47 and 48 are shown in the drawings for purposes of explanation and illustration. The support structure is preferably a framework, such as a free standing tower or rack 41, which has substantially vertical columns. The columns can be laterally supported by cross members as shown in FIG. 3.

Each shelf can be tilted for receiving, storing and discharging articles, designated 51, 52, and 53. Each shelf is pivotally mounted relative to the support structure for movement at least between an upwardly tilted receiving position, illustrated by shelves 45, 46 and 48, and a downwardly tilted discharge position, illustrated by shelf 47. One or more intermediate storage positions are also possible. The free ends of the shelves of each stack extend toward the free ends of the opposing stack. The forward end of shelf 47 is depicted in the downwardly tilted discharge position which preferably aligns with the free end of a next lower, opposing shelf 48 in the upwardly tilted receiving position, to allow for the smooth transfer of article 53, for example a beverage container, from an upper shelf to the next lower, opposing shelf.

Articles are introduced to the apparatus at or near the top of the stacks. A biased ramp 44, shown in FIG. 1, can be provided to receive articles at the top of the apparatus and pivot under the weight of articles to transfer the articles to the first, uppermost shelf 45. The articles are transferred sequentially downward in a zig-zag manner through the stacks, from one shelf to the next lower shelf, and each article descends through the stacks until it is disposed on the lowest unfilled shelf. The system can include a fixed, upwardly tilted dispensing ramp to dispense articles discharged from the lowest shelf to conveyor 49, forming the first part of the second conveying path 6.

Means for raising the shelves, such as pneumatic air cylinders 50, is provided for driving the shelves to the receiving position when the shelf is empty, but allowing descent when an article is present on the shelf. A valve control system 54 can be provided, responsive to a control system, for example a computer. The receiving position can also serve as a storing position for an article. The article will occupy a shelf until the next lower shelf assembly is prepared to receive the article. The tilt angles of the receiving and discharge positions relative to horizontal can be varied, but preferably are between 5 and 20 degrees. One or more intermediate storage positions, preferably at or near the horizontal, are also possible.

The fluid-operated system is effective for light-weight articles, containers and packages. In addition to light-weight applications, the fluid-operated system is also effective for heavy-weight articles, containers and packages, for example of 100 pounds or more.

The operation of working stations 20 and 40, as well as the first and second conveying paths 4 and 6, must be coordinated with one another. A central control 80 is indicated in FIG. 1, the control functions are indicated by dashed lines 81, 82, 83 and 84. The operation of working station 70 is essentially autonomous, and it need only be turned on and off. The operation of output working station 62 can be independent, or it can also be controlled, in whole or in part, by central control 80, depending upon the nature of output working station 62. The central control 80 preferably comprises a computer, for monitoring operation of the various constituent components of the conveying system, and for supplying appropriate control signals. Each of the articles on the input pallets is preferably provided with an SKU bar coded identifier. The central control can use the SKU identifiers to track the articles throughout the system, as required. The central control 80 preferably establishes a first control sequence for the moving of the successive homogeneous layers to the conveyor 25, establishes a second control sequence for the distributing of the articles into the plurality of vertical conveying and storage paths 43 and establishes a third control sequence for the supplying of the articles to the conveyor 49 of the second conveying path 6.

The central control 80 can be provided with a desired mix of articles to be grouped in the output working station 62. In order to provide the proper mix, the articles must be supplied from the vertical storage and conveying paths 43 to the conveyor 49 in a predetermined sequence, so that the output stream of articles on the second conveying path 6 is appropriate for the desired grouping made by output working station 62. The central control can provide instructions, for example by illuminating selectable messages for each of the pallet in-feed conveyors, indicating which kind or type of product should be supplied to each input conveyor. Alternatively, the input conveyors can be loaded with pallets of different kinds of articles, and the different kinds of articles can be identified by means of the SKU identifiers. All of the articles required for a particular output grouping can be stored in different ones of the vertical storage and conveying paths, and supplied therefrom in the appropriate predetermined sequence, since each of the vertical conveying and storage paths is independently operable and controllable.

The output working station 62 can be a palletizing working station, creating pallets of layers of the articles, in which, for example, each layer is mixed or the layers are homogeneous but the layers are different from one another. Output working station 62 can also be embodied as a conveying system for loading delivery vehicles, in which case the predetermined sequence of articles established by the central control 80 can correspond to one at a plurality of article delivery criteria, for example both distribution or route order.

Working station 70 is shown more fully in FIGS. 5 and 6. In the sense of FIG. 5, groups of articles are conveyed from left to right. Three such stations 70 are provided in the first conveying path 4. Each working station 70 comprises three rotatable parts. A first rotatable part 71 is a belt, forming a lower side edge of the working station, and rotating about axes which are somewhat inclined from vertical by an angle α as shown in FIG. 6. The belt moves in the direction indicated by arrow J. A first set of rollers is disposed between a dividing strip 74 and the belt roller 71. A second set of rollers 73 is disposed between the dividing strip 74 and the edge of the working station opposite belt roller 71. The speed of the belt 71 in the conveying direction is somewhat slower than the rotational speed imparted to the articles by rollers 72. The rotational speed imparted to the articles by rollers 73 is somewhat faster than the speed imparted to the articles by rollers 72. In conjunction with the angled orientation of the working station 70, shown in FIG. 6, the effect is to rearrange groups of articles into a single line of articles. It has been determined that three such working stations 70 will effect proper alignment of all groupings of articles as may be conveyed from conveyor 25 to conveyor 31. The alignment of the articles is important with respect to assuring that each article can be properly distributed into any desired one of the vertical conveying and storage paths 43.

The invention can also be embodied in a method for mixing different articles from respective homogeneous stacks of homogeneous layers. The first step in the method is selectively moving successive homogeneous layers of articles from each of the respective stacks to a first conveying path in an ordered sequence. The second step is distributing the articles conveyed on the first conveying path into different ones of a plurality of selectable vertical conveying and storage paths; terminating the first conveying path at the vertical conveying and storage paths. The third step is supplying the articles from the different vertical conveying and storage paths to a second conveying path in a predetermined sequence. The final step is arranging the articles conveyed on the second conveying path into groups related to the predetermined sequence.

The method may comprise the further steps of rearranging each of the successive layers of articles into successive aligned rows of articles along the first conveying path, and distributing the aligned rows of the articles into the different ones of the plurality of the selectable vertical conveying and storage paths.

The method preferably comprises the step of conveying the articles unidirectionally in the vertical conveying and storage paths, and more particularly, only downwardly in the vertical conveying and storage paths.

The method may also comprise the step of establishing the predetermined sequence of the articles on the second conveying path by defining control sequences for each of the moving, distributing and supplying steps. The sequence of articles can be predetermined according to one of a plurality of delivery criteria, including forming new pallets of layers of the articles.

What is claimed is:

1. A system for mixing different articles from respective homogeneous stacks of homogeneous layers, comprising:

first and second working stations;
   a first conveying path originating at said first working station and terminating at said second working station;
   a second conveying path originating at said second working station;
   said first working station having means for selectively moving successive homogeneous layers of articles from each of said respective stacks to said first conveying path;
   said second working station receiving said articles from said first conveying path and distributing said articles into selected ones of a plurality of conveying and storage paths, said articles being supplied to said second conveying path from said conveying and storage paths in a predetermined sequence; and,
   means for controlling said first and second working stations to establish said predetermined sequence, said controlling means tracking machine readable identifiers of said articles.

2. The system of claim 1, further comprising a third working station forming a part of said first conveying path, said third working station having means for rearranging each of said successive layers of articles into aligned rows of articles, said aligned rows of articles being conveyed to said second working station.

3. The system of claim 2, further comprising a fourth working station, at which said second conveying path terminates, said fourth working station having means for regrouping said articles in an arrangement depending upon said predetermined sequence.

4. The system of claim 1, further comprising a third working station, at which said second conveying path terminates, said third working station having means for regrouping said articles in an arrangement depending upon said predetermined sequence.

5. The system of claim 1, wherein said moving means in said first working station moves entire layers of said articles at one time.

6. The system of claim 1, wherein said control means predetermines said sequence according to one of a plurality of article delivery criteria.

7. The system of claim 1, wherein said control means establishes a first control sequence for said moving of said successive homogeneous layers, establishes a second control sequence for said distributing of said articles into said plurality of conveying and storage paths and establishes a third control sequence for said supplying of said articles to said second conveying path.

8. The system of claim 1, wherein said machine readable identifiers comprise SKU identifiers.

9. The system of claim 3, wherein said fourth working station comprises means for directing said articles to different storage locations related to said predetermined sequence.

10. The system of claim 4, wherein said third working station comprises means for directing said articles to different storage locations related to said predetermined sequence.

11. The system of claim 1, wherein said second working station comprises a sorting rack for receiving said articles, said rack having a plurality of respective sets of shelves movably supported on said rack in a staggered orientation enabling said articles to be conveyed along said plurality of different and selectable paths.

12. The system of claim 11, wherein said conveying and storage paths comprise vertical conveying and storage paths.

13. The system of claim 1, wherein said conveying and storage paths comprise vertical conveying and storage paths.

14. A method for mixing different articles from respective homogeneous stacks of homogeneous layers, comprising the steps of:

selectively moving successive homogeneous layers of articles from each of said respective stacks to a first conveying path in an ordered sequence;
   distributing said articles conveyed on said first conveying path into different ones of a plurality of selectable conveying and storage paths;
   terminating said first conveying path at said conveying and storage paths;
   supplying said articles from said different conveying and storage paths to a second conveying path in a predetermined sequence;

arranging said articles conveyed on said second conveying path into groups related to said predetermined sequence; and, tracking machine readable identifiers of said articles during said arranging.

15. The method of claim 14, further comprising the step of palletizing said groups of articles.

16. The method of claim 14, further comprising the step of predetermining said sequence according to one of a plurality of delivery criteria.

17. The method of claim 14, further comprising the steps of:

rearranging each of said successive layers of articles into successive aligned rows of articles along said first conveying path; and, distributing said aligned rows of said articles into said different ones of said plurality of said selectable conveying and storage paths.

18. The method of claim 14, comprising the step of distributing said articles conveyed on said first conveying path into different ones of said plurality of selectable conveying and storage paths.

19. The method of claim 14, further comprising the step of establishing said predetermined sequence of said articles on said second conveying path by defining control sequences for each of said moving, distributing and supplying steps.

20. The method of claim 14, comprising the step of tracking SKU identifiers of said articles.

* * * * *